March 27, 1962 E. J. BANIA 3,026,562
PATTY FORMING MOLD
Filed Feb. 4, 1960
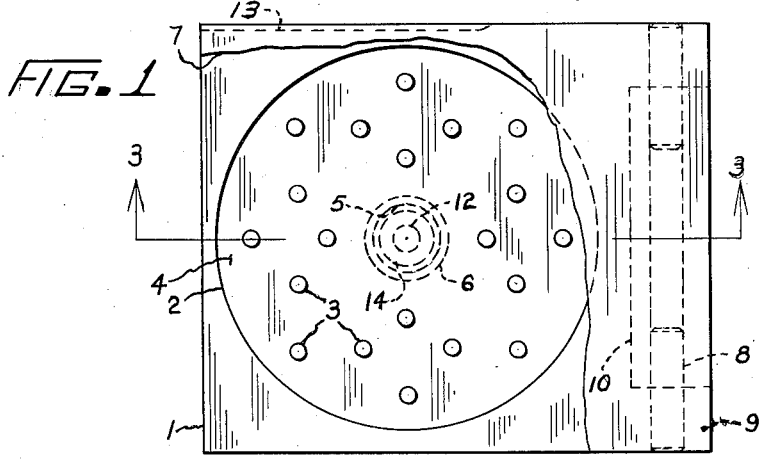
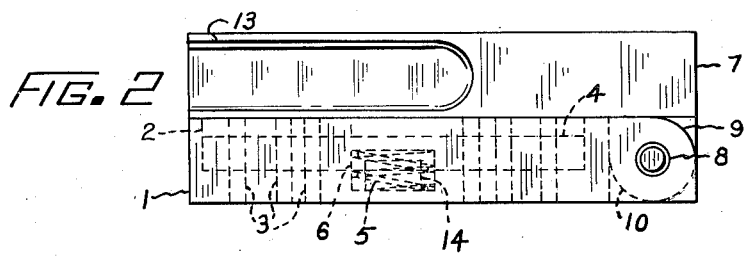
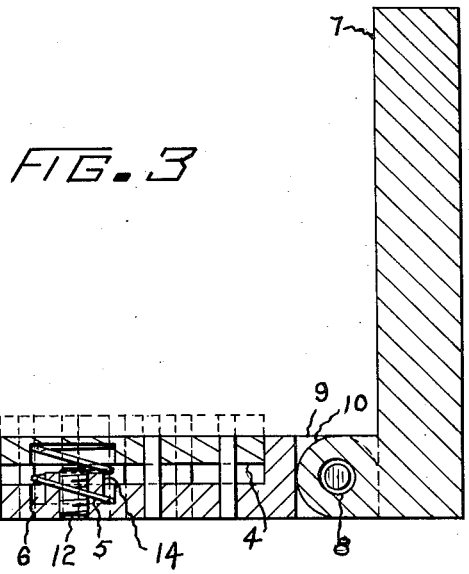
INVENTOR.
EDWARD J. BANIA
BY
ATTORNEY

3,026,562
PATTY FORMING MOLD
Edward J. Bania, 8933 Ohio, Detroit, Mich.
Filed Feb. 4, 1960, Ser. No. 6,748
3 Claims. (Cl. 17—32)

This invention relates to molds and particularly molds for forming patties of ground meat or other readily compressible material.

An object of the invention is to provide a mold adapted to impart desired dimensions to a patty and to concurrently extend through the patty in the direction of its thickness a considerable number of perforations, for contributions to the uniformity and rapidity of a subsequent cooking operation, and also facilitating biting into the patty.

Another object is to form said perforations by a plurality of pins upstanding from the base of the mold and further serving as guides for a plate slidable up and down to eject a completed patty from the mold.

Another object is to interpose a spring between the chambered base of the mold and an ejecting plate vertically slidable in the chamber of said base, such spring automatically lifting a formed patty clear of such chamber upon uncovering of the mold.

Another object is to provide in an improved manner for regulating the thickness of patties formed in the mold.

These and various other objects are attained by the construction hereinafter described, and illustrated in the accompanying drawing, wherein:

FIG. 1 is a top plan view of the improved mold showing the covering position of its cover, and with such cover partially broken away.

FIG. 2 is a side elevational view of the same.

FIG. 3 is a vertical sectional view on the line 3—3 of FIG. 1, and showing a molded patty in dotted lines, with the mold cover occupying its open position and thus affording removal of such patty.

In these views, the reference character 1 designates a rectangular base formed with a mold chamber 2 opening upwardly in such base and preferably circular. Press-fitted or otherwise secured in the base are a considerable number of upright pins 3 suitably spaced apart, such pins projecting into the chamber 2 and terminating substantially in the plane established by the top face of the base. Slidably engaging said pins is an ejecting plate 4 which is yieldably upwardly urged by a coiled spring 5 disposed centrally of the base and occupying a recess 6 jointly formed in the base and ejector plate. The mold has a cover plate 7 substantially conforming in size and shape to the base and hinged to the latter by a pair of aligned pins 8 spaced outwardly from an edge of the base. To receive said pins, the base is integrally formed with a pair of lugs 9 projecting laterally from said edge and spaced to accommodate between such lugs a relatively long lug 10 projecting downwardly from the seating face of the cover plate.

To afford a certain desired regulation of the thickness of a patty 11, formed in the described mold, an adjusting screw 12 is vertically threaded into a boss 14 formed in the base and disposed in a concentric relation to the recess 6. The upward extent of said screw limits down travel of the ejecting plate, thus determining the patty thickness.

The cover plate 7 is grooved at 13 along its edges transverse to the hinge axis to facilitate its manipulation.

In use of the described mold, a quantity of ground meat or other readily compressible material is deposited on the ejecting plate when in its raised position, as per FIG. 3, the cover plate then being also raised as in such figure. The deposited amount is preferably measured either by weight or volume, so as to produce a patty substantially conforming to the space afforded by the mold. Upon then swinging the mold cover to its covering position, said material is spread to a diameter determined by the chamber 2, and the spring 5 is compressed to permit resultant lowering of the ejecting plate and to effect penetration of said material by the upper end portions of the pins 3. The cover plate is then returned to its raised position, allowing a full expansion of the spring 5 and consequent raising of the ejecting plate and the shaped and perforated patty as shown in FIG. 3. The latter may now be removed and the operation repeated.

In cooking a patty formed as described, its perforations admit heated air and steam to the patty at numerous points, expediting cooking and directly applying heat at said numerous points to the interior of the patty as well as to its outer portion.

Obviously several of the described molds may be combined, if desired, to permit concurrent shaping and perforating of a plurality of patties.

It has been found that time required to cook hamburger patties formed with perforations as described, is literally about one-third less than when the perforations are omitted. A further advantageous result is that such perforated patties will cook in their own juices, thus improving the flavor. Patties lacking such perforations, however, must be cooked with the aid of grease or oil, to avoid their sticking to the cooking surface.

What I claim is:

1. A patty forming mold comprising a base having an upwardly opening mold chamber, a plurality of substantially parallel upright spaced pins having their lower portions set rigidly into the base, said pins projecting upwardly into and substantially through said chamber to perforate a patty occupying the chamber, an ejecting plate freely fitted in the chamber and movable up and down therein, the pins guiding said plate in such movement, a spring within the base and reacting between said plate and the base to yieldably resist down travel of the plate, a cover for the mold chamber, and means disposed at one side of said chamber for hinging the cover to the base and thus affording swinging of the cover from a covering position to a position exposing said chamber.

2. A patty forming mold as set forth in claim 1, said base and ejecting plate having a recess jointly formed therein in a substantially central relation to the mold chamber, and said spring being coiled within such recess.

3. In a patty forming mold as set forth in claim 2, a screw set into the base and upwardly extending into the mold chamber, in a substantially central relation to such chamber to regulate downward actuation of the ejector plate.

References Cited in the file of this patent
UNITED STATES PATENTS

| | | |
|---|---|---|
| 1,896,313 | Hubbell et al. | Feb. 7, 1933 |
| 2,004,530 | Howe et al. | June 11, 1935 |
| 2,173,760 | Moran | Sept. 19, 1939 |
| 2,200,270 | Flores | May 14, 1940 |